April 13, 1965     O. E. SORENSEN     3,177,588
METHOD AND MEANS FOR MEASURING CENTER DISTANCES
Filed Dec. 5, 1962     5 Sheets-Sheet 1
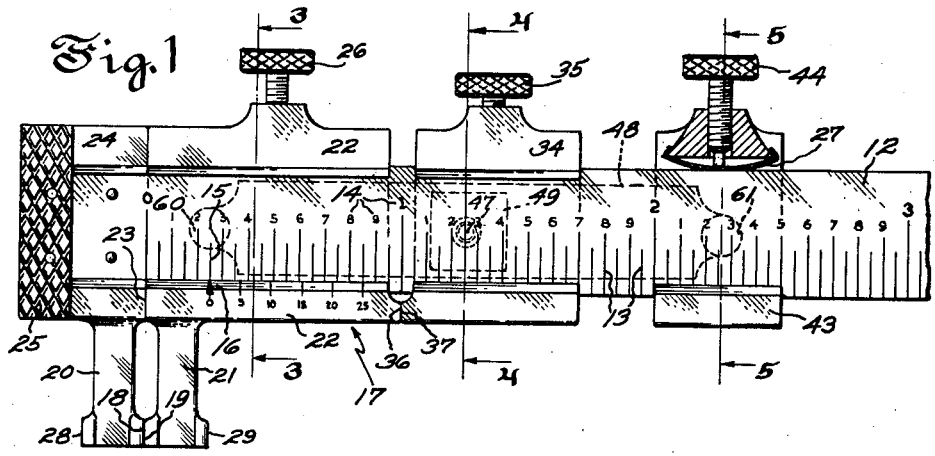
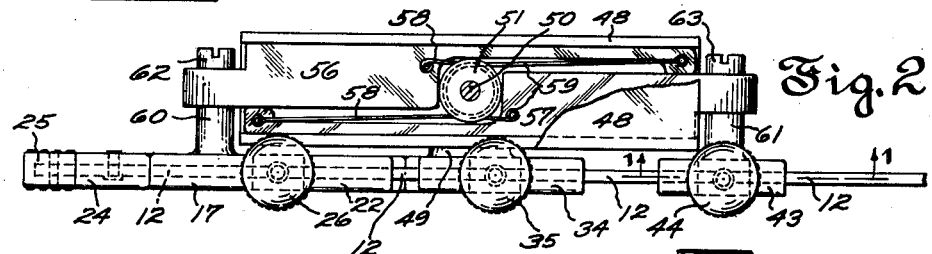
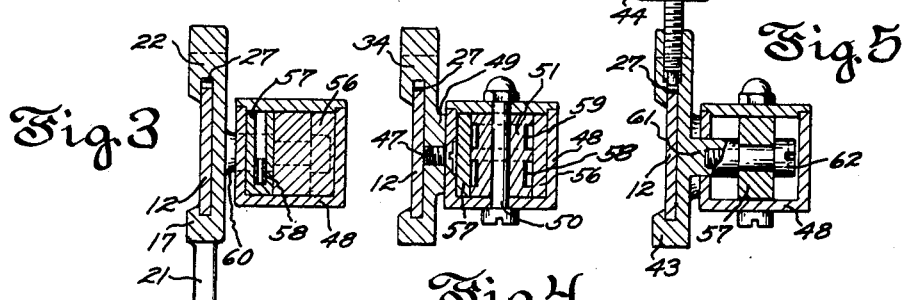
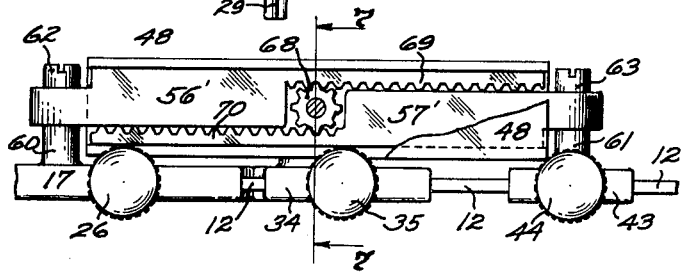
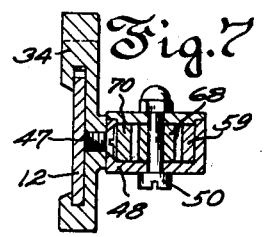
INVENTOR.
Otto E. Sorensen
BY
*ATTORNEY*

April 13, 1965  O. E. SORENSEN  3,177,588
METHOD AND MEANS FOR MEASURING CENTER DISTANCES
Filed Dec. 5, 1962  5 Sheets-Sheet 2
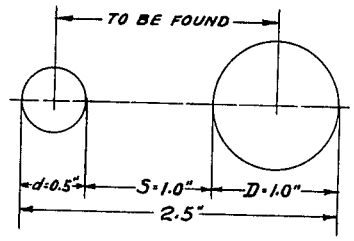
Fig. 8
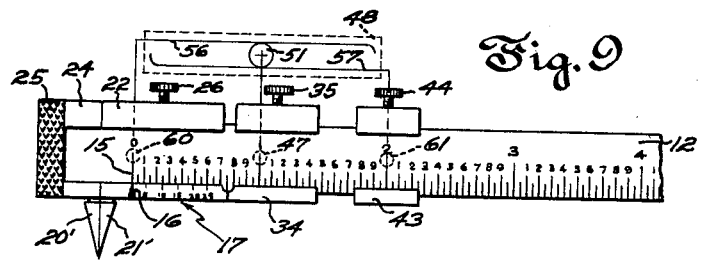
Fig. 9
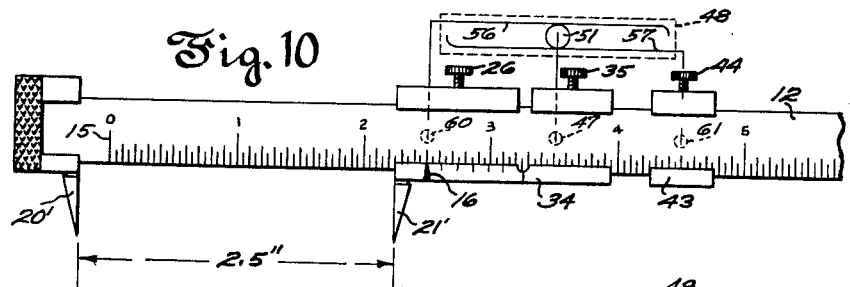
Fig. 10
Fig. 11
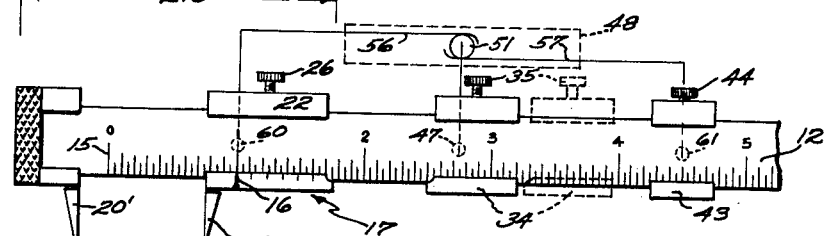
Fig. 12
INVENTOR.
Otto E. Sorensen
BY
ATTORNEY April 13, 1965    O. E. SORENSEN    3,177,588
METHOD AND MEANS FOR MEASURING CENTER DISTANCES
Filed Dec. 5, 1962    5 Sheets-Sheet 3

INVENTOR.
Otto E. Sorensen
BY
ATTORNEY

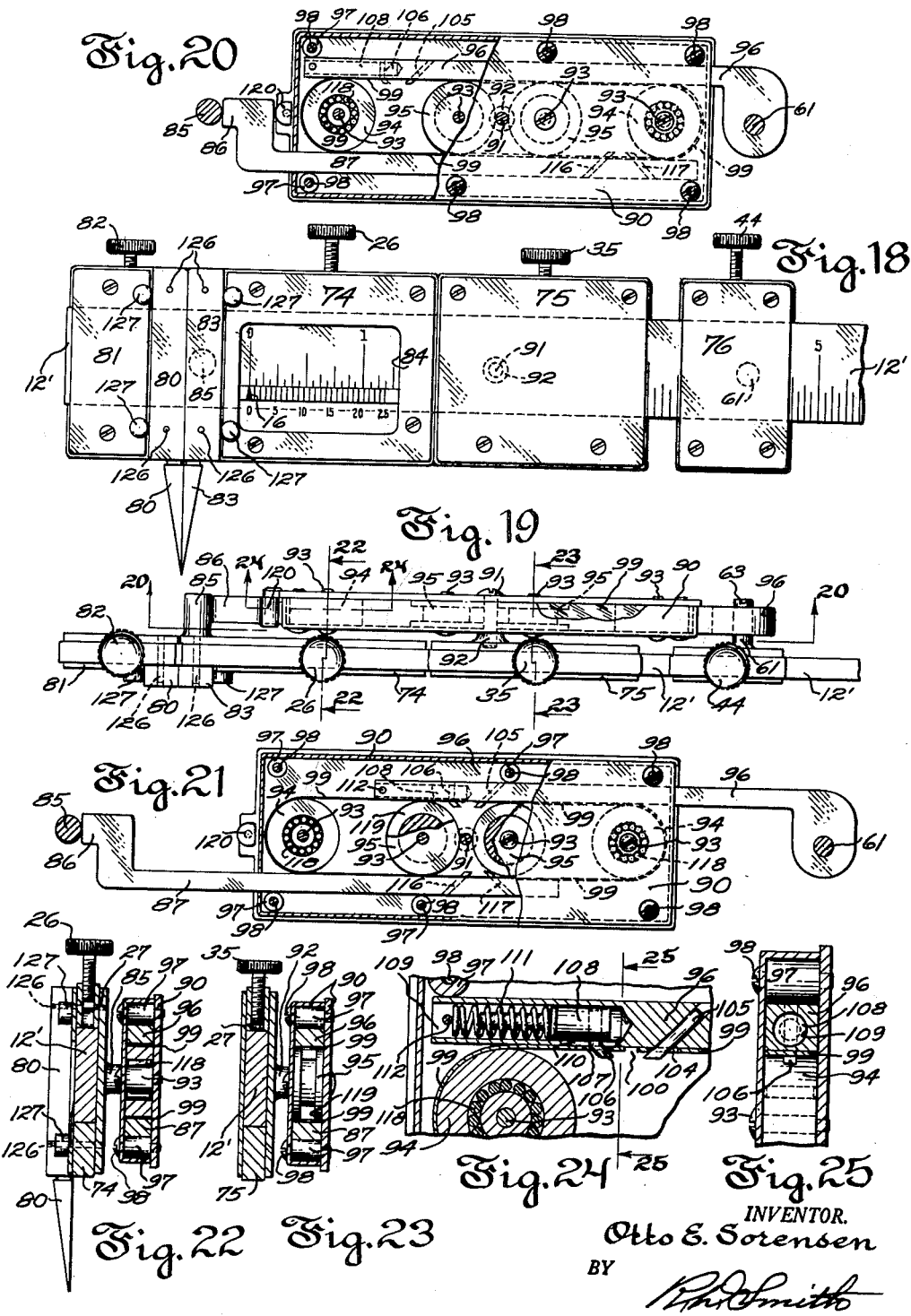

April 13, 1965   O. E. SORENSEN   3,177,588
METHOD AND MEANS FOR MEASURING CENTER DISTANCES
Filed Dec. 5, 1962   5 Sheets-Sheet 5
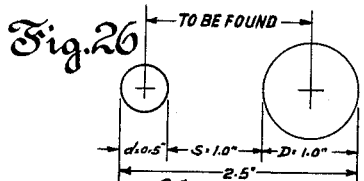
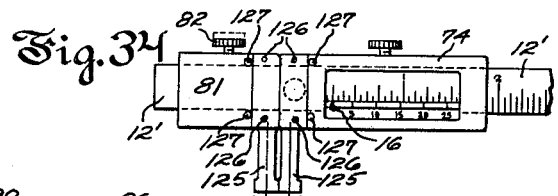
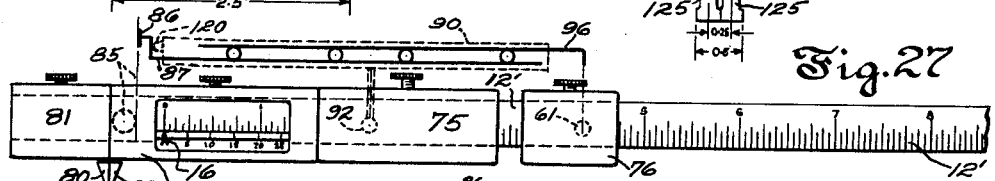
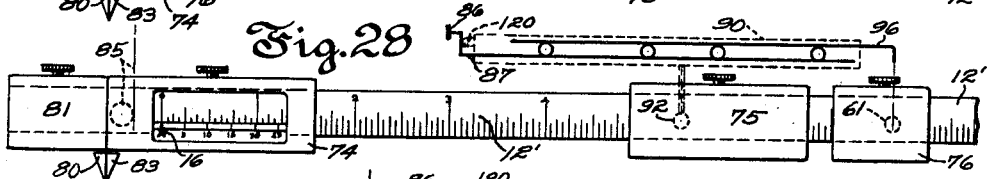
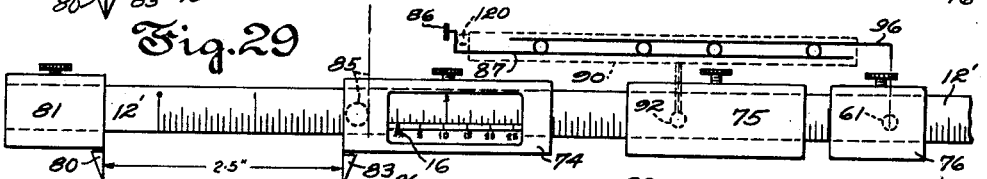
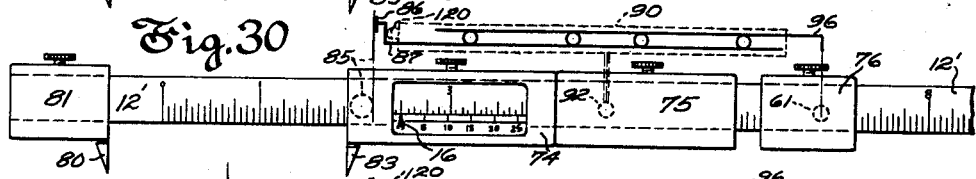
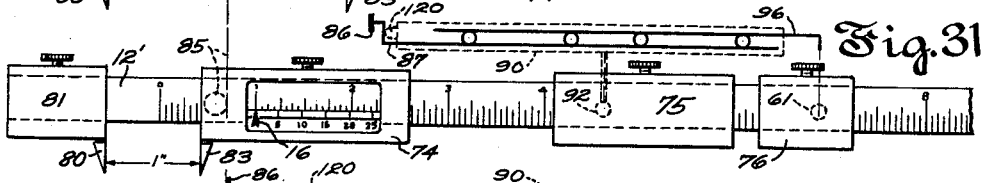
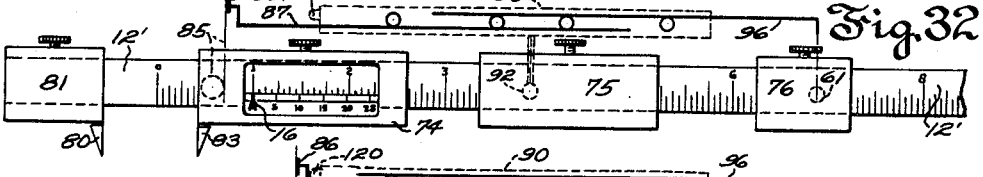
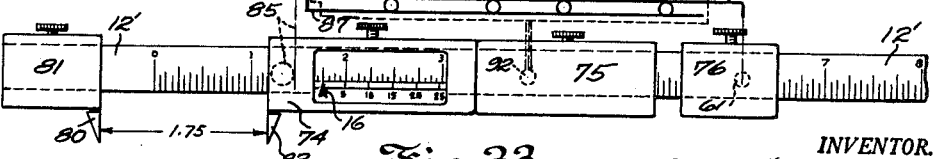
INVENTOR.
Otto E. Sorensen
BY
ATTORNEY

United States Patent Office 3,177,588
Patented Apr. 13, 1965

3,177,588
METHOD AND MEANS FOR MEASURING CENTER DISTANCES
Otto E. Sorensen, Fairfield, Conn.
(264 Kossuth St., Bridgeport, Conn.)
Filed Dec. 5, 1962, Ser. No. 242,560
20 Claims. (Cl. 33—143)

Calipering instruments have been proposed for measuring and indicating by direct reading, i.e. without mental computation, the distances between physically unmarked or indiscernible centers of two circular spaced apart holes or other empty spaces that are bordered by caliperable boundaries. The most practical of such instruments have been of the dimension averaging, beam calipers type in which a scale beam carries graduations progressing from a "zero" or starting graduation that are marked by indicia denoting half-values of the true distance of each of such indicia from the "zero" or starting graduation. In such instruments, and in contrast to conventional beam calipers, the actual spacings of the graduations is double that of the dimensions denoted by the scale indicia.

In the use of such prior instruments a first calipering step has been to separate two calipering legs a distance apart equal to the distance that separates the holes. This has been followed by a second calipering step involving a further or additive separation of the calipering legs along the same scale a distance composed of a repetition of the said distance of hole separation plus the sum of the diameters of the holes. One half of the total extent of leg separation thus set off sequentially and additively along the same scale will indicate on a half-value denominated scale the true distance between the uncaliperable centers of the holes. A dimension averaging instrument must have its scale of graduations calibrated with half-value indicia in order to be able to read directly on the scale the true distance between the hole centers. As an example, in order to measure and indicate a distance between hole centers which actually, say, is twelve inches, a scale of graduations has been necessary which actually is more than twice as long as twelve inches while the scale indicia need read only up to the said twelve inches. This obviously requires that the overall length of the instrument be much longer than a conventional beam calipers and results in the instrument becoming unwieldy when center distances of substantial length are to be measured or tested. To maintain rigidity in a beam of such excess length, the beam must have a width and thickness that is undesirably heavy to handle. Also the cost of manufacturing beam calipers with a scale of graduations having distorted or artificial measurement indicia is increased because of departure from conventional practices in manufacture. An instrument, thus artificially graduated, is impractical of use in ordinary measuring or testing of workpiece dimensions and therefore requires that a shop, to be prepared for efficient measuring of center distances, must purchase and keep in stock both a regular and a special kind of beam calipers.

Heretofore, in attempts to avoid the above disadvantages and to be able to ascertain center distance by direct reading of conventional indicia, i.e. indicia which denote true measurement values of the spacing of the graduations, it has been proposed to mark such scale, not on the main beam of the instrument, but on some auxiliary rod or bar that is slidable with respect to the main beam into positions projecting endwise therefrom. But this likewise requires the same undesirable excess of overall length of the instrument in proportion to the linear extent of the work that is to be measured.

An object of the present invention is to combine in a beam calipers capable of giving a direct reading of non caliperable center distance the advantages of an instrument of minimum length having scale graduations denoted by conventional indicia so that a single such instrument can be used for both ordinary measuring of distances between caliperable points as well as for measuring and giving a direct reading of distances between uncaliperable or imperceptible space centers.

A related object is to avoid repetitive calipering of the distance separating the holes in the movement of calipering legs along the scale so that such distance does not require to be halved but only the sum of the diameters of the holes needs be halved in the functioning of the instrument. This is done according to the present improvements by establishing on the scale a marker slide associated with movement halving mechanism which provides a means for automatically reducing by one-half the extent of backward travel of the marker slide toward zero when the calipering of the nearest sides of two holes follows the calipering of the farthest apart sides of said holes. In effect this reduces the calipered measurement of only the sum of the diameters of two holes to a measurement that is the sum of the radii of the holes whereby the distance of separation of the holes needs not be halved because it never became doubled in the calipering operations.

My improved method contemplates either of two final method steps for arriving at a correct reading of center distance on a truly denominated scale of measurement indicating graduations. One of such final steps is to set off additively on the scale from the graduation correctly indicating the distance separating the work holes a distance equal to the aforesaid sum of the radii of the work holes. An alternative final step is to set off subtractively on the scale from the graduation indicating the distance between the farthest apart borders of the work holes this same sum of the radii of the work holes.

Instructions for practising the improved method and constructing an instrument embodying the invention that may be used as an aid in performing such method are contained in the following description having reference to the appended drawings wherein:

FIG. 1 is an elevational view in larger than actual size showing a successful form of improved beam calipers incorporating the invention for ascertaining center distance in accordance with my improved method.

FIG. 2 is a plan view looking at FIG. 1 from above.

FIGS. 3, 4, and 5 are views taken in section respectively on the planes 3—3, 4—4, and 5—5, in FIG. 1, looking in the direction of the arrows.

FIG. 6 shows a modification of parts of the instrument of FIGS. 1 to 5, inclusive.

FIG. 7 is a view taken in section on the plane 7—7 in FIG. 6 looking in the direction of the arrows.

FIG. 8 is a partially dimensioned diagram illustrating a problem in center distance measuring typical of the need for the present improvement in beam calipers.

FIG. 9 diagrammatically represents a beam calipers mostly like that of FIGS. 1 to 5, inclusive, except equipped with pointed calipering legs as relatively positioned for storage or when not in use.

FIG. 10 shows certain slides of the instrument of FIG. 9 carrying pointed legs that have been separated to an extent equal to the distance between the farthest apart boundaries of the two circular areas in FIG. 8 whose indiscernible center distance is to be ascertained.

FIG. 11 shows a second step in the measuring of said center distance whereby the movable slide-carried calipering leg has been returned toward the other calipering leg to an extent to reduce the space therebetween so that said space accords with the distance between the nearest together boundaries of the circular areas of FIG. 8.

FIG. 12 shows the same slide carried leg finally separated from the other calipering leg to a differing extent that lies between the extents of leg separation in FIG. 10 and in FIG. 11, respectively, so as to give a direct reading on the scale of the beam that tells the true distance between the indiscernible centers of the circular areas in FIG. 8.

Figure 13:
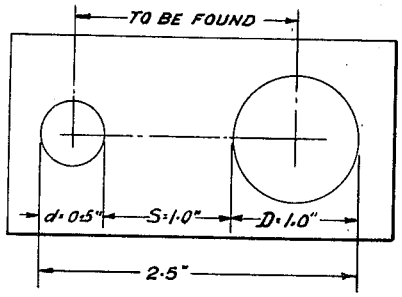

FIG. 13 represents circular areas like those of FIG. 8 consisting of holes in a work piece which can be calipered by insertion into said holes of calipering legs of modified shape to present work contacting terminals of substantial width instead of being pointed as in FIGS. 9 to 12, inclusive.

FIGS. 14, 15, 16 and 17 correspond respectively to FIGS. 9 to 12, inclusive, and demonstrate successive steps in the measuring of center distance by making use of the instrument constructed as in FIGS. 1 to 7, inclusive, when applied to two circular holes in a work piece.

FIG. 18 shows in elevation a different modification of the construction of the instrument of FIGS. 1 to 6, inclusive, also incorporating the present improvements.

FIG. 19 is a plan view of the instrument of FIG. 18.

FIG. 20 is a front elevation of the motion halving mechanism as viewed from the plane 20—20 in FIG. 19 with casing partially broken away to expose internal parts.

FIG. 21 is a view like FIG. 2 showing parts of the mechanism differently positioned.

FIG. 22 is a view taken in section on the planes 22—22 in FIG. 19, looking in the direction of the arrows.

FIG. 23 is a view taken in section on the planes 23—23 in FIG. 19, looking in the direction of the arrows.

FIG. 24 is an enlarged fragmentary view taken in section on the plane 24—24 in FIG. 19, looking in the direction of the arrows.

FIG. 25 is a view taken in section on the plane 25—25 in FIG. 24, looking in the direction of the arrows.

FIGS. 26 to 33, inclusive, correspond to FIGS. 8 to 12, inclusive, and demonstrate successive steps in the measuring of center distance by use of an instrument constructed as in FIGS. 18 to 25, inclusive.

FIG. 34 shows a modification of the starting positions of parts of the instrument as distinguished from FIG. 27 when calipering legs are used like those in FIGS. 1 to 14.

FIGS. 1 to 6 show in enlarged size a portion of the whole length of a beam calipers constructed in a manner for use in measuring center distances by methods that accord with the invention.

The beam 12 of the instrument is rigid and carries a scale of graduations 13 denominated by indicia 14 as true dimensional values of the spacing thereof from a starting point 15 on the scale. In FIG. 1 such starting point is denominated as the graduation reading 0.25", with which graduation the index 16 carried on calipering slide 17 is in register when the nearest together sensing edges 18 and 19 of calipering legs 20 and 21, respectively, are closed into mutual abutment. To avoid strain on the calipering legs from accidental impact therebetween, the left edge of the box or body portion 22 of slide 17 in FIG. 1 abuts firmly against the right edge of a stop shoulder 23 that is rigid with leg 20. Stop shoulder 23 may be a permanent and fixed lug on beam 12 or may comprise the right edge of a slide member 24 that is movable along the scale beam but is brought to rest in its travel toward the left in FIG. 1 by a head 25 fixed on or integral with the beam 12. For purposes of the present improvement parts 12, 20, 24 and 25 may all be regarded as either fixedly united or integral.

Calipering slide 17 can be fastened or released at any position along the beam by means of the thumb screw 26 which, as in conventional practice, acts as a set screw against a leaf spring 27 that bears between the top edge of the beam in a groove in the box portion 22 of the slide and affords friction lightly opposing shifting of the slide along the beam when thumb screw 26 is eased outward. This type of construction can be repeated with all slides and set screws and is best illustrated with respect to slide 43 in FIG. 1.

For specific purposes of the present invention there is provided a marker slide 34 movable along beam 12 in the manner of calipering slide 17 to and from abutting relation to the latter on the opposite side thereof from calipering leg 20. Such abutting relation is shown in FIGS. 1, 9, 10, 12, 14, 15 and 17. Marker slide 34 can be stayed against shifting along the beam or released for sliding therealong by means of a thumb screw 35. The abutting of slides 22 and 34 takes place at a stop lug 36 on the former and a lug 37 on the latter.

In addition to slides 22 and 34 there is needed in the practice of this improved method an anchorage device which is here shown as a third slide 43 freely movable along the scale beam 12 to various settings in any of which settings it can be stayed by turning down the thumb screw 44 in the manner of thumb screws 26 and 35.

Slides 22, 34 and 43 are interconnected by a mechanism that causes marker slide 34 to trail the calipering slide 22 along beam 12 in the direction toward calipering leg 20 with an extent of travel that is always half the extent of travel of the calipering slide in said direction. Such mechanism may take various forms but in FIGS. 1 to 6 is shown to comprise a hollow floating frame or housing 48 open at both ends and mounted fixedly by screw 47 on a boss 49 on the rear face of marker slide 34. The hollow of housing 48 is spanned by a pivot pin 50 removably lodged in the top and bottom walls thereof. A compound or doubly-grooved pulley 51 turns freely on pin 50 within the housing. Two push-pull rigid thrust bars 56 and 57 are slidable relatively to each other and relatively to housing 48. Each of these thrust bars is tied to the other by taut unstretchable flexible metallic ribbons 58 and 59 entrained respectively about the grooves in spool 51 and anchored at each end to a different one of the thrust bars which they serve to connect. An end of thrust bar 56 that is external to the left end of housing 48 is fixedly but removably secured by bolt to a lug 60 projecting rearward from and rigid with calipering slide 22, while an end of thrust bar 57 that is external to the right end of housing 48 is fixedly but removably secured to a lug 61 projecting rearward from and rigid with anchorage slide 43.

In the modified construction of FIGS. 6 and 7, the parts are as shown in FIGS. 1 and 6 except that a spur pinion 68, that is freely rotatable on pivot pin 50 is substituted for spool 51, and for the steel ribbons 58 and 59 there are substituted racks of gear teeth 69 and 70 on thrust bars 56' and 57', respectively.

In use of my improved instrument as next to be described, it will be understood from FIG. 2 that each increment of sliding movement of either the thrust bar 56 or the thrust bar 57 relative to housing 48 is accompanied automatically by an exactly equal increment of movement of the other of said bars in the opposite direction relative to the housing 48. The same is true of thrust bars 56' and 57' in FIG. 6. And it will be kept in mind that the housing 48 is in floating relation to beam 12 since it shifts position therealong in unison with the movements of marker slide 34.

Operation of the instrument in carrying out the presently improved methods of center distance measuring and testing will be described with reference to diagrammatic FIGS. 8 to 12, wherein the calipering legs are pointed instead of having substantial width as in FIGS. 1 to 7 and 13 to 17.

In FIG. 9 slides 17 and 34' of the instrument are pushed to the extreme left and index 16 on calipering slide 17 registers with a starting point on the scale which is coincident with the scale graduation denominated "0." This correctly indicates on the scale the extent of separation of the work sensing points which to all practical purposes is zero. For calipering the farthest apart boundaries of the two circular space areas in FIG. 8, with all thumb screws 26, 35, and 44 loosened, calipering slide 17 is shifted from its position in FIG. 9 to its position in FIG. 10 while the marker slide 34 and anchorage device 43 move in unison therewith. The separation of the leg points then becomes 2½" and is so indicated by the index 16 on the beam scale. Such separation is the sum of the diameters of the circular space areas 1½" plus such distance 1" (if any) that separates said areas.

From this calipered 2½" the step next is to substract mechanically the sum of the diameters of the two space areas which is 1½", leaving the separation of the calipering leg points reduced to the distance 1" that separates the space areas as shown in FIG. 11 which is done by shifting calipering slide to the left from its position in FIG. 10 to place the leg points in calipering register with the nearest together sides of the circles in FIG. 8. In such shifting of the calipering slide 17, the anchorage device 43 is fixed on beam 12 by tightening screw 44 and the mechanism comprising parts 48, 51, and 56 to 59, inclusive, causes marker slide 34 to trail the calipering slide 17 toward the left from its broken line position to its full line position in FIG. 11. Here the marker slide will now be fastened in fixed relation to the beam by tightening thumb screw 35. This trailing movement of marker slide 34 will have equalled exactly one-half the extent of movement of calipering slide 17 from its position in FIG. 10 to its position in FIG. 11.

Now with marker slide 34 thus fixed to the beam and both calipering slide 17 and anchorage device 43 free to travel along the beam, thumb screw 44 having been loosened to so permit, the calipering slide can be shifted toward the right from its position in FIG. 11 to its ultimate position in FIG. 12 where it is restored into abutting contact with the marker slide 34. Simultaneously, since the position of housing 48 along the beam is now temporarily fixed, the anchorage device 43 will idly be drawn to the left to its position in FIG. 12. Thus the distance that calipering slide 17 moved from its position in FIG. 10 to its position in FIG. 11 has been halved and this translates a calipering of the sum of the diameters of the space areas into a scale reading of the sum of the radii of the space areas, leaving incorporated in the reading of measurement on the scale that actual distance (if any) which separates the space areas whose center distance is to be ascertained. The resultant reading on the beam scale is 1¾" the correct dimension of the center distance.

While the use of our improved beam calipers has been described as a series of steps in manipulating the parts thereof, such steps do not require the use of the slides 22, 34 and 43 on the beam 12 as a mere method of ascertaining center distance according to these improvements and without computation. For instance the method may be employed by using only the graduated beam 12 in conjunction with an ordinary pair of draftsman's or machinist's dividers in the following manner. First, and referring to FIG. 8, the dividers would be set to the dimension 2.5" and that distance laid off from the zero graduation toward the right on the scale whereupon the other point of the dividers will fall on the 2.5" location in the scale. This location may then be temporarily marked in any suitable manner without giving attention to the numerical values of neighboring graduations. The dividers may then be set to span the diameter of the largest space circle in FIG. 8 designated as 1" and then used to set off this dimension toward the left from the marked 2.5" location on the scale thus to arrive at the 1.5" location which may then be temporarily marked without attention to the numerical value of neighboring graduations. The dividers may then be set to span the diameter of the smaller circular space in FIG. 8 and then used to set off this distance 0.5" farther toward the left on the scale in FIG. 10 whereupon the other point of the dividers will fall upon the 1" location in the scale. The space between the first marked 2.5" location and the last said 1" location on the scale may then be divided into two equal halves by use of the dividers as is conventional in halving any desired linear distance. Or if proportional dividers are used, set in 1-to-2 ratio and having two pairs of spreadable points, one point of the farthest spread pair of points may be placed on the already marked 2.5" location and the other point of said pair placed on the already marked 1" location whereupon the distance between the narrower spread points of the proportional dividers will become exactly one-half the distance between the farthest spread points of the divider. The thus obtained half value of the distance between the 2.5" location and the 1" location thus set up in the dividers can then be spaced off forwardly or to the right from the 1" location, or backwardly to the left from the 2.5" location, whereupon the other point of the dividers will fall on the 1.75" location of the scale just as the index 16 registers with such location in FIG. 12. In this manner the steps of my improved method are seen to be capable of being employed without the use of the slides 22, 34, or 43 and the center distance, labeled "to be found" in FIG. 8, will have been ascertained without attention to the numerical value of any of the intermediate locations on the scale and without mental computation of any kind as is the object of the invention.

Figure 14:
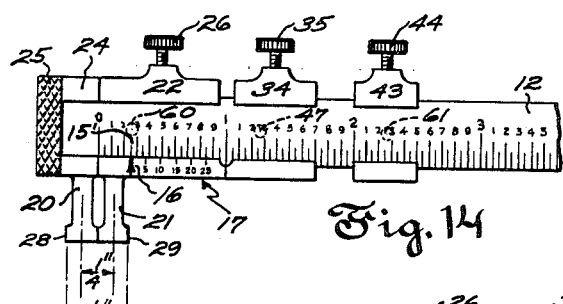
Figure 15:
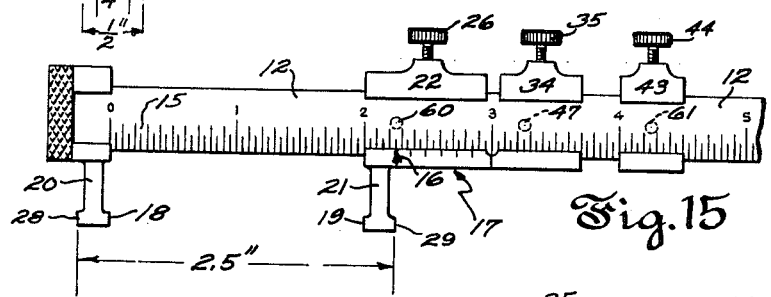
Figure 16:
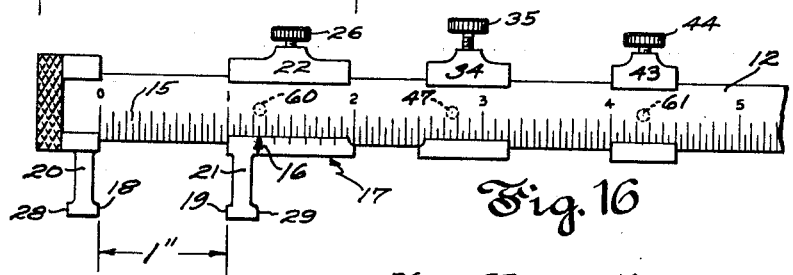
Figure 17:
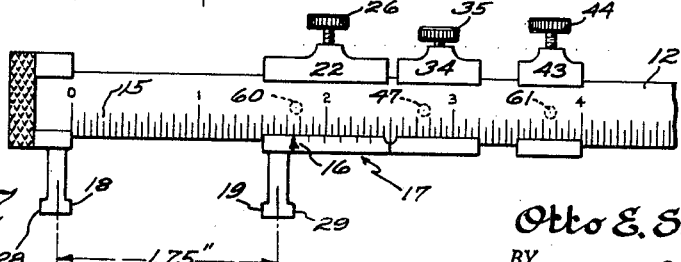

In FIGS. 13 to 17, inclusive, the mechanism 51, 56, 57 and 48, which serves mechanically to interconnect the slides, is assumed to be present as in FIGS. 8 to 12, inclusive. The main purpose of FIGS. 13 to 17 is to explain that where the calipering legs of the instrument are not pointed, but have substantial width aggregating say ½" when in mutual abutment as indicated in FIG. 14, the placement of the index 16 on the slide 17 shall be such as to register with a starting point 15' which is coincident with the .25" graduation of the scale instead of with the zero graduation of the scale. This compensates for one-half the combined widths of the sensing ends of the calipering legs 20 and 21, namely the distance between the outer sensing surfaces 28 and 29 of the leg ends when their inner sensing surfaces 20 and 21 abut. Obviously the starting point on the scale should coincide with whatever graduation is denominated to be equal to one-half the combined width of the legs, or what amounts to the same thing, the distance between the center lines of the two legs indicated to be ¼" in FIG. 14.

In use of the instrument when constructed as in FIGS. 1 and 2 or FIG. 6, it has been proposed that the bar 56 may be fastened permanently to the lug 60 that projects fixedly from slide 22. This results in the need for all three slides 17, 34 and 43 to be moved in unison along the beam 12 in carrying out the step of the method that consists in calipering the larger workpiece dimension, 2.5 inches, as illustrated in FIGS. 9 and 10 and in FIGS. 14 and 15. Should this be found to be an impediment to the sensitiveness with which the legs of the instrument can be shifted to match the dimension of the workpiece, a modification of the construction shown in FIGS. 1, 2 and 6 is shown in FIGS. 18–25 wherein only the calipering slide alone need be moved for adjusting the legs of the instrument to an extent of separation that accords exactly with the dimension of 2.5" of the workpiece first to be calipered.

In the modification shown in FIGS. 18 to 25, inclusive, the slides 17, 34 and 43, hereinbefore described, are replaced by slides 74, 75 and 76, respectively. The beam 12' and its graduations may remain the same, but for purposes that will later appear the calipering leg 80, otherwise like 20', is not integrated with nor permanently fixed on beam 12' but is carried by a box 81 that is adjustable lengthwise of the beam and can fixedly be set in adjusted position thereon by the lock screw 82. Also for purposes hereinafter explained the calipering leg 80 and the companion leg 83, analagous to leg 21, are removable from the box 81 and from slide 74, respectively, so as to be replaced by legs of differing kinds such as shown in FIG. 34.

Calipering slide 74, as does slide 17, carries the index mark 16 at the zero position of the vernia graduations which are marked along the bottom of the window 84. This index is shown in FIG. 18 to register with the "0" graduation on the beam carried scale of graduations. Slide 74 also carries the lug 85 akin to lug 60 in FIG. 2, but in the modification being described this lug 85 is no longer fixed permanently to a push-pull bar of the motion halving mechanism as in FIGS. 2 and 6. Instead it merely projects backward from the slide into the path of an abutting head 86 on the push-pull bar 87 of the modified motion halving mechanism.

This mechanism in FIGS. 18 to 25, inclusive, comprises a hollow floating frame or housing 90 open at both ends and mounted fixedly by screw 91 on a boss 92 projecting from the rear face of marker slide 75. The hollow of housing 90 is spanned by four pivot pins 93 alike, lodged in the front and rear walls thereof. Two pulley wheels 94 alike turn freely on two of the pivot pins within opposite end portions of housing 90. Two additional support wheels 95 turn freely on the other two of the four pivot pins 93. Another push-pull rigid bar 96, comparable to bar 57, is slidable relatively to bar 87 and to housing 90.

Bars 87 and 96 are confined to longitudinal sliding movement in parallel paths by confinement between wheels 94, 95 and guide rollers 97 each of which is free to turn on a pivot stud 98 lodged in housing 90. Between the bars 87, 96 and the wheels 94, 95 a non stretchable belt 99 of thin and preferably highly tempered steel, such as watch spring stock, is tightly entrained about pulley wheels 94 and rides tangentially on support wheels 95. Operatively belt 99 is endless but as a means of keeping it taut about pulley wheels 94, 95 there is actually a small gap 100 between the ends thereof (see FIG. 24) which ends are kept constantly drawn toward each other by the following belt tightening device.

Again referring to FIGS. 24 and 25, the belt tightener comprises a spur pin 105 tight in and projecting obliquely from bar 96 through an aperture 104 in belt 99 near the gap 100 therein. A tensioning pin 106 also projects obliquely from bar 96 in a direction of incline opposite to that of spur pin 105 and engages an aperture 107 in belt 99 near the other end of gap 100. Tensioning pin 106 is fixedly carried in a plunger 108 that is slidable lengthwise of bar 96 within a bore 109 therein and projects laterally from plunger 108 through an elongate slot 110 communicating with bore 109. Plunger 108 is backed up by a compression spring 111 the anchored end of which abuts lengthwise against a cross pin 112 that bridges bore 109. It thus will be apparent that spur pin 105 and tensioning pin 106 constantly draw the ends of belt 99 toward each other so as to maintain the gap 100 at a minimus thus keeping the belt reliably tight about the pulley wheels 94, 94.

From FIGS. 21 and 24 it will also be clear that running of the belt 99 will cause bar 96 to move in unison therewith in either direction of its lengthwise movements. Bar 87 is likewise caused to move in unison with the running of belt 99 by means of spur pins 116, 117, each of which projects obliquely from the bar and catches in a closely fitting aperture in the belt. Obviously then, bar 87 and bar 96 will be caused to move simultaneously equal distances in respectively opposite directions.

I prefer to mount pulley wheels 94 on roller or needle bearings 71 because wheels 94 turn while under the load imposed by the tensioning of belt 99. Also the support wheels 95 have a circumferential groove to permit the free passing of the tensioning pin 106 and the spur pins 105, 116 and 117. Housing 90 is equipped with a stop 120 to limit the extent of movement of bar head 86 inward toward the housing.

In order that calipering legs 124, 125, like those shown in FIG. 34, or legs or any other desired style, may be substituted for legs 80, 83 in FIG. 18 the legs are removably lodged on the box 81 and slide 74, respectively, by means of two holes in each leg that register with and fit snugly on two dowel pins 126 projecting from the box and from the slide and which have enough "spring" in a lateral direction away from retainer studs 127 also projecting from the face of the box and slide to permit the shank of each leg to be pressed onto the dowel pins and snap into retained position under the heads of studs 127 to be very slightly overhung thereby or studs 127 may be screws that thread into box 81 or slide 74 and thus be removable to release the legs for replacement.

This feature, in combination with the adjustability of box 81 to different fixed positions along the end portion of beam 12, accommodates and interchange of calipering legs of different style because the index mark 16 on the calipering slide 74 can be set in a starting position on the beam scale that registers with a scale graduation that accords with half the overall width of the sensing ends of both calipering legs combined. Then both calipering legs can be established in starting position by shifting box 81 toward calipering slide 74 along the beam until abutment takes place to establish and maintain a correct starting position for the slide 74 in successive uses of the instrument with chosen style of leg for center distance measuring. Box 81 is then firmly locked in its thus adjusted position by means of the set screw 82 aforesaid.

Specifically it will be seen in FIG. 34 that half the overall width of the calipering legs is .025" and that index mark 16 on the calipering slide therefore registers with graduation .025" on the beam scale instead of with "0" graduation on the beam scale as in FIG. 18. In FIG. 1 it would have involved a change in the positioning of the index mark 16 on the calipering slide 17, but by the adjustability of box 80 in FIG. 18 no change is required in the positioning of the graduations on either the slide 74 or the scale beam 12 to accompany a change of calipering legs from the style in FIGS. 9–12 to the style in FIGS. 14–17.

Operation of the instrument of FIG. 18 will now be explained when equipped with pointed legs theoretically having no width at their work sensing points. The circles, holes or other areas having no caliperable centers are assumed in FIG. 26 to be the same as in FIGS. 8 and 13. FIGS. 26 to 33, inclusive, show one possible series of steps that can be performed by the instrument of FIGS. 18–25 in carrying out the presently improved method of center distance measuring.

A typical way of using an instrument having the modified construction of FIGS. 18–25 in measuring the center distance of two holes separated and dimensioned as in FIGS. 8 and 13 and repeated in FIG. 26, is as follows:

The condition of the instrument when picked up for use may be as in FIG. 27 where the pointed calipering legs 80, 83 abut without space therebetween and the index mark 16 of calipering slide 74 registers with the zero graduation on scale beam 12'. Since the head 86 of bar 87 is now free to separate from the lug 85 on calipering slide 74, the latter may be left unmoved and the marker slide 75 together with anchorage slide 76 moved far to the right on beam 12' into any arbitrary out of the way position illustrated by FIG. 26.

This leaves calipering slide 74 free to be moved alone to the right for separating legs 80, 83 to the lengthiest of the calipered distances, 2.5", as shown in FIG. 29. In this position the calipering slide 74 will be temporarily locked to the beam 12' by means of its set screw.

While calipering slide 74 remains thus locked in its position, marker slide 75 and anchorage slide 76 in unison will be moved to the left until the former slide abuts against the now locked calipering slide at which time the head 86 of bar 87 will have resumed contact with the lug 85 on the calipering slide. The anchorage slide 76 will now be locked by means of its set screw on beam 12' in the position shown in FIG. 30.

In FIG. 31 the calipering slide has been unlocked from the beam and moved to the left, again free from the head 86 of bar 87, until the legs 80, 83 are brought into calipering register with the distance 1.0" separating the holes that are being measured. Calipering slide 74 is again temporarily locked in place in this position in FIG. 31.

Recalling that the anchorage slide 76 remains locked to the beam and that the calipering slide 74 is also again now locked to the beam, the marker slide 75 is moved to the left until the head 86 of bar 87 touches the lug 85 on the calipering slide 74. When this occurs the marker slide will have moved to the left exactly half the distance that calipering slide 74 was moved to the left in FIG. 3 in reducing the greater calipered distance of leg separation 2.5" to the less calipered distance 1.0". In other words the marker slide will have been moved to the left 0.75" which is the sum of the radii of the work holes instead of the sum of the diameters of the work holes. Also at this stage of the operation it will be noted that the distance of separation of the work holes has not been set off twice additively along the scale as it has been explained must be done in the use of a dimension averaging instrument for measuring center distance.

All that now remains to be done is to lock marker slide 75 to the beam in its position shown in FIG. 32 and to unlock both calipering slide 74 and anchorage slide 76 from the beam, after which the simple return movement of calipering slide 74 to the right until it again abuts against the now locked marker slide 75 adds to the 1.0" separation of legs 80–83, which is the distance between the holes, the distance of 0.75" which is the sum of the radii of the holes. The exact true center distance 1.75" is now accurately indicated by index mark 16 against the true graduation 1.75" on the scale. All calipering movement of slide 74 has been free and unencumbered by having to move with it either the marker slide 75 or the anchorage slide 76.

It will be apparent that as a means for automatically halving the extent of slide movement at any stage in a center distance measuring operation the movement halving mechanism of FIGS. 18–25 can readily be substituted for the movement halving mechanism of FIGS. 2 or 6 by merely securing the bar 87 to the lug 60 instead of leaving it free to separate therefrom. Likewise the movement halving mechanisms of either FIG. 2 or FIG. 6 can be substituted for the mechanism of FIGS. 18–25 by freeing the bars 56 or 56' from fixed attachment to the lug that is carried by the calipering slide. These and other variations of the shapes and arrangements of parts herein disclosed can be resorted to as a means of practicing the present improvements and all such variations which come fairly within the scope of the invention as defined by the appended claims are intended to be covered thereby.

I claim:

1. A beam calipers for ascertaining without computation a distance between indiscernible centers of a pair of separate spaces by calipering boundaries of the respective spaces comprising, a beam carrying a scale of graduations denominated as true dimensional values of the spacing thereof from a starting point on the scale, first and second calipering legs extending laterally from said beam, a calipering slide movable along said beam carrying said second calipering leg and carrying index means positioned to register with said scale of graduations, a marker slide movable along said beam to and from abutting relation to said calipering slide at the opposite side thereof from said first calipering leg and releasably fixable in position on said beam, an anchorage device releasably fixable in position on said beam at the opposite side of said marker slide from said calipering slide, and automatic motion proportioning mechanism so interconnecting said anchorage device and said marker slide as to cause said marker slide to move along said beam simultaneously with movement of said calipering slide in the same direction along said beam with an extent of travel equal to half the extent of travel of said calipering slide when said anchorage device is fixed on the beam.

2. A beam calipers as defined in claim 1, in which the said automatic motion proportioning mechanism includes members operatively related respectively to said calipering slide and to said anchorage device, and means in fixed relation to said marker slide operatively interconnecting said members in a manner to insure equal extents of movement thereof relative to said marker simultaneously in respectively opposite directions.

3. A beam calipers as defined in claim 2, in which the said means comprises a frame including an elongate housing fixed on the said marker slide flanking the face of the beam opposite the said scale of graduations and out of whose opposite ends the said members respectively project.

4. A beam calipers as defined in claim 3, in which the said members are parallel and rigid and overhang each other lengthwise of the said beam.

5. A beam calipers as defined in claim 4, in which the said rigid members are operatively interconnected by at least one flexible ribbon.

6. A beam calipers as defined in claim 5, together with pulley means having said flexible ribbon entrained thereabout.

7. A beam calipers as defined in claim 6, in which the said pulley means is pivotably supported on the said frame.

8. A beam calipers as defined in claim 4, in which each of the said rigid members carries a rack of gear teeth, together with a gear pivotally supported by said frame in mesh simultaneously with both of said racks.

9. A beam calipers as defined in claim 1, in which each of the said slides and the said anchorage device carry independently manipulatable set screws cooperative with the said beam selectively to fasten or release said slides or device individually against movement along said beam.

10. A beam calipers as defined in claim 1, in which the said automatic motion proportioning mechanism includes two rigid parallel members operatively related respectively to said calipering slide and to said anchorage device, a frame flanking the said beam carried by said marker slide, pulley wheels pivotally supported by said frame, and a belt trained about said pulley wheels having two stretches extending therebetween to travel simultaneously in respectively opposite directions, said two stretches of belt being fastened respectively to said two members, whereby movement of either member relative to said frame causes equal movement of the other of said two members in an opposite direction relative to said frame.

11. A beam calipers as defined in claim 10, in which one of the said members is fastened to the said anchorage device and the other of said members is in abutting relation to and separable from the said calipering slide.

12. A beam calipers as defined in claim 10, in which the said belt intervenes between the said two members and the said pulley wheels.

13. A beam calipers as defined in claim 12, together with a straight row of guide means on the same frame contactable by the faces of the said members opposite the said stretches of belt.

14. A beam calipers as defined in claim 12, together with guide wheels rotatably carried by the said frame between the said two stretches of belt and between the said two pulley wheels located and of size to be contacted by and contribute to the support of said stretches of belt.

15. A beam calipers as defined in claim 10, in which the said belt has a gap in one of its said stretches bridged by one of the said members and separating end portions of the belt, one of said end portions of said belt being fixed to one of said members, and automatically acting belt tightening means connecting the other end portion of said belt to the same said member.

16. A beam calipers as defined in claim 15, in which the said automatically acting belt tightening means includes a catch engageable with the said other end portion of the said belt carried by the said one of the said members in a manner to shift relatively thereto in the directions of travel of said belt, and a spring biasing said catch to so shift relatively to said member in a direction tending to close the said gap between said end portions of the belt.

17. A beam calipers as defined in claim 16, in which the said catch comprises a tensioning pin projecting diagonally from the said one of said members toward the said gap and hooked into an aperture in the said belt spaced from said gap.

18. A beam calipers as defined in claim 17, together with spur pins lodged in and projecting in converging diagonal directions from the other of the said rigid parallel members and individually hooked into neighboring apertures respectively in the stretch of the said belt not engaged by the said belt tightening means.

19. The method of ascertaining without mental computation the distance between indiscernible centers of a pair of separate spaces by setting off and marking extents of distances related to boundaries of said spaces on a scale of graduations denominated by indicia as the true dimensional values of the spacing thereof from a starting point on the scale, which includes the steps of, setting two boundary sensing elements at a first extent of spread in accord with the distance separating the farthest apart boundaries of said spaces, setting off said first extent of spread forwardly from a starting point on a scale of truly denominated graduations and marking a first reference location on said scale removed from said starting point by said first extent of spread, setting two elements at a second extent of spread equal to the sum of the width of said spaces, setting off said second extent of spread backward from said first reference location toward said starting graduation on said scale and marking a second reference location on said scale removed from said first reference by said second extent of spread, dividing the distance between said two reference locations on the scale into half distances, setting off one of said half distances forwardly from said second reference location in a direction away from said starting graduation, and reading on the truly marked graduations of said scale a third location removed from said second reference location by said half distance, whereby the unknown distance between said space centers will be indicated by the indicia of the scale graduation at said third location.

20. The method of ascertaining without mental computation the distance between indiscernible centers of a pair of separate spaces by setting off and marking extents of distances related to boundaries of said spaces on a scale of graduations denominated by indicia as the true dimensional values of the spacing thereof from a starting point on the scale, which includes the steps of, setting two boundary sensing elements at a first extent of spread in accord with the distance separating the farthest apart boundaries of said spaces, setting off said first extent of spread forwardly from a starting point on a scale of truly denominated graduations and marking a first reference location on said scale removed from said starting point by said first extent of spread, setting two elements at a second extent of spread equal to the sum of the width of said spaces, setting off said second extent of spread backward from said first reference location toward said starting graduation on said scale and marking a second reference location on said scale removed from said first reference by said second extent of spread, dividing the distance between said two reference locations on the scale into half distances, setting off one of said half distances backwardly from said first reference location in a direction toward said starting graduation, and reading on the truly marked graduations of said scale a third location removed from said first reference location by said half distance, whereby the unknown distance between said space centers will be indicated by the indicia of the scale graduation at said third location.

No references cited.